United States Patent [19]

Reifschneider

[11] 3,726,910

[45] Apr. 10, 1973

[54] (((ALKYLTHIO)ALKYL)THIO)PHENYL CARBAMATES

[75] Inventor: Walter Reifschneider, Midland, Mich.

[73] Assignee: The Dow Chemical Company, Midland, Mich.

[22] Filed: Apr. 1, 1970

[21] Appl. No.: 24,819

[52] U.S. Cl............260/471 C, 260/465 D, 260/470, 260/479 C, 424/300, 424/304, 424/311, 424/314
[51] Int. Cl..............................................C07c 125/06
[58] Field of Search ......................260/479 C, 471 C

[56] References Cited

UNITED STATES PATENTS 3,492,335  1/1970  Gubler.............................260/479 C
2,776,197  1/1957  Gysin et al........................260/479 C Primary Examiner—Henry R. Jiles
Assistant Examiner—L. Arnold Thaxton
Attorney—Griswold and Burdick, Theodore Post and C. Kenneth Bjork

[57] ABSTRACT

Novel (((alkylthio)alkyl)thio)phenyl carbamates are claimed, corresponding to the formula

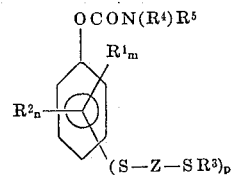

wherein $R^1$ represents a lower alkyl, lower alkoxy, fluoro, chloro, bromo or iodo group; $R^2$ represents an $R^1$ or a cyclopentyl, cyclohexyl, phenyl, naphthyl, nitro, carboxy, carbalkoxy, trifluoromethyl or cyano group; $m$ represents an integer from 0 to 3; $n$ represents an integer from 0 to 2; Z represents a 1 to 4 carbon straight-chain or branched-chain alkylene group; $R^3$ represents a lower alkyl, lower haloalkyl, lower alkenyl, or lower alkynyl group; $p$ represents an integer from 1 to 2; $R^4$ represents a lower alkyl, vinyl or phenyl group; $R^5$ represents a lower alkyl or an H group; and the sum of $m+n+p$ is an integer from 1 to 5. The terms "lower alkyl", "lower haloalkyl" and "lower alkoxy" represent groups containing from 1 to 4 carbon atoms. The terms "lower alkenyl" and "lower alkynyl" represent groups containing from 2 to 4 carbon atoms. The compounds are useful as pesticides.

10 Claims, No Drawings

(((ALKYLTHIO)ALKYL)THIO)PHENYL CARBAMATES

SUMMARY OF THE INVENTION

This invention concerns the new compounds, (((alkylthio)alkyl)thio)phenyl carbamates, represented by the formula

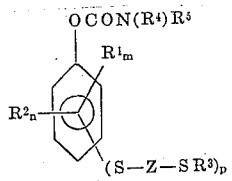

wherein $R^1$ represents a lower alkyl, lower alkoxy, fluoro, chloro, bromo or iodo group; $R^2$ represents an $R^1$ or a cyclopentyl, cyclohexyl, phenyl, naphthyl, nitro, carboxy, carbalkoxy, trifluoromethyl or cyano group; $m$ represents an integer from 0 to 3; $n$ represents an integer from 0 to 2; Z represents a 1 to 4 carbon straight-chain or branchedchain alkylene group, such as, for example, methylene, ethylene, propylene, isopropylene, butylene or isobutylene; $R^3$ represents a lower alkyl, lower haloalkyl, lower alkenyl, or lower alkynyl group; $p$ represents an integer from 1 to 2; $R^4$ represents a lower alkyl, vinyl or phenyl group; $R^5$ represents a lower alkyl or an H group; and the sum of $m+n+p$ is an integer from 1 to 5. The terms "lower alkyl", "lower haloalkyl" and "lower alkoxy" represent groups containing from 1 to 4 carbon atoms, such as, for example, methyl, ethyl, propyl, isopropyl, butyl, isobutyl, or sec. butyl; halomethyl, haloethyl, halopropyl, halobutyl; and methoxy, ethoxy, propoxy and butoxy, respectively. The terms "lower alkenyl" and "lower alkynyl" represent groups containing from 2 to 4 carbon atoms, such as, for example, ethenyl, propenyl, butenyl; and ethynyl, propynyl and butynyl, respectively.

The compounds are crystalline solids or oils which are soluble in common organic solvents, such as, for example, acetone and benzene and slightly soluble in water. They are useful as pesticides for the control of a wide variety of plants including bacterial plants and fungi.

Representative compounds of the present invention include 4-((2-(methylthio)ethyl)thio)-3,5-xylyl N-methyl carbamate, 4-((2-(methylthio)ethyl)thio)-m-tolyl N-ethyl carbamate, 2-chloro-4-(((methylthio)methyl)thio)phenyl N-butyl carbamate, p-(((methylthio)methyl)thio)phenyl N-isopropyl carbamate, 4-(((methylthio)methyl)thio-o-tolyl N-methyl carbamate, p-((2-methylthio)ethyl)thio)-phenyl N-ethyl carbamate, 2-chloro-4-((2-(methylthio)-ethyl)thio)phenyl N-methyl carbamate, 2-chloro-5-methyl-4-((2-(methylthio)ethyl)thio)phenyl N-methyl carbamate, 4-(((methylthio)methyl)thio)-m-tolyl N-methyl carbamate, o-((2-(methylthio)ethyl)thio)phenyl N,N-dimethyl carbamate, 5-t-butyl-2-((2-(methylthio)ethyl)thio)phenyl N-methyl carbamate, 2-cyclohexyl-4-((2-(methylthio)ethyl)thio)phenyl N-methyl carbamate, 2,6-di-t-butyl-4-((2-methylthio)ethyl)-thio)phenyl N-methyl carbamate, 4-((2-(methylthio)ethyl)-thio)-2,3,5,6-tetrachlorophenyl N-methyl carbamate, 2-methoxy-4-((2-(t-butylthio)ethyl)thio)phenyl N-methyl carbamate, 4-((2-(t-butylthio)ethyl)thio)-2-phenylphenyl N-methyl carbamate, 4-((3-(t-butylthio)propyl)thio)-3,5-xylyl N-methyl carbamate, 4-((2-(t-butylthio)ethyl)thio)-3,5-xylyl N-methyl carbamate, 4-((3-(methylthio)propyl)-thio)-3,5-xylyl N-methyl carbamate, p-((3-(ethylthio)propyl)-thio)phenyl N,N-dimethyl carbamate, 2,6-dichloro-4-((2-chloro-3-(ethylthio)propyl)thio)phenyl N-vinyl carbamate, 3-trifluoromethyl-4-((2-(methylthio)ethyl)thio)phenyl N-phenyl carbamate, 2-(1-naphthyl)-4-(((methylthio)methyl)-thio)phenyl N-methyl carbamate, 2best 4-(((2-(methylthio)-ethyl)thio)phenyl N-vinyl carbamate, 2-cyclohexyl-4-(((2-(methylthio)ethyl)thio)phenyl N,N-diethyl carbamate, 4-(((methylthio)methyl)thio)-o-tolyl N-phenyl carbamate, 2,6-dichloro-4-((2-isopropylthio)-1-methylethyl)thio)phenyl N,N-diethyl carbamate, 2-nitro-4-((2-(methylthio)ethyl)thio)-phenyl N-methyl carbamate and 3-cyano-4-((2-methylthio)-ethyl)thio)phenyl N-methyl carbamate.

The (((alkylthio)alkyl)thio)phenyl carbamate monoesters of the present invention are prepared by reacting a lower alky, vinyl or phenyl isocyanate with an (((alkylthio)alkyl)thio)phenol in the presence of a basic amine, such as, for example, trimethylamine, triethylamine, pyridine, lutidine, picoline or quinoline, according to the following equation, wherein $R^1$, m, $R^2$, n, Z, $R^3$, p and $R^4$ have the significance previously given:

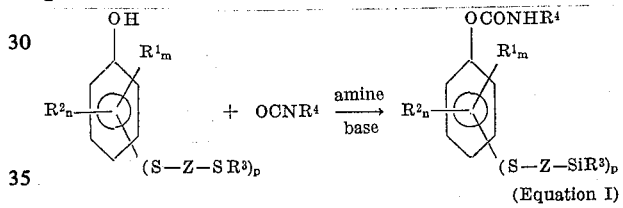

(Equation I)

The reaction is conveniently carried out in an inert organic solvent as reaction medium, such as, for example, methylene chloride, tetrahydrofuran, benzene, toluene, xylene, carbon tetrachloride, ether, dioxane or mixtures thereof, or in the presence of an excess amount of isocyanate as reaction medium. The amounts of the reagents to be employed are not critical, some of the desired product being obtained when employing any proportions of the reactants. However, the reaction consumes the reactants in equimolar proportions and good yields are obtained when equimolar proportions of the phenolic and isocyanate reactants (or an excess of isocyanate reactant) are employed. The reaction is somewhat exothermic and takes place smoothly at a temperature at which the carbamate ester linkage is formed, conveiently at a temperature of about 0° C. to about 100° C. and preferably at a temperature of about 20° C. to about 75° C.

In carrying out the reaction, the reactants are mixed and contacted together in any convenient fashion in the presence of the basic amine as catalyst and the resulting mixture is maintained for a period of time in the reaction temperature range.

The (((alkylthio)alkyl)thio)phenyl N,N-di-substituted carbamates of the present invention are prepared by reacting an N,N-di-substituted carbamoyl chloride with an alkali metal or ammonium salt of an (((alkylthio)alkyl)-thio)phenol according to the following equation, wherein $R^1$, $m$, $R^2$, $n$, Z, $R^3$, $p$, $R^4$ and $R^5$ have the significance previously given and M represents an alkali metal or ammonium group:

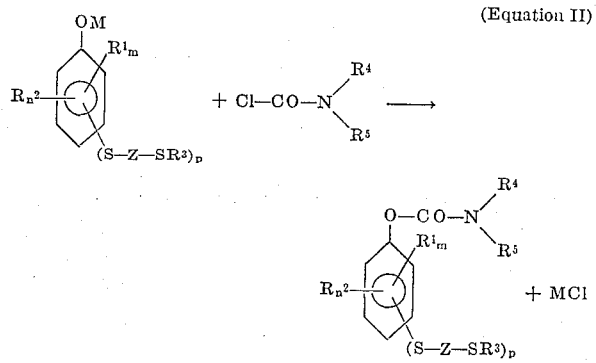
(Equation II)

The reaction is conveniently carried out in an inert organic solvent as reaction medium, such as, for example, methylene chloride, tetrahydrofuran, benzene, toluene, xylene, carbon tetrachloride, ether, dioxane or mixtures thereof. The amounts of the reagents to be employed are not critical, some of the desired product being obtained when employing any proportions of the reactants. However, the reaction consumes the reactants in equimolar proportions and good yields are obtained when equimolar proportions of the phenate and carbamoyl chloride reactants are employed. The reaction is somewhat exothermic and takes place smoothly at a temperature at which byproduct alkali metal or ammonium chloride is formed and the carbamate ester linkage is established, conveniently at a temperature of about 0° C. to about 100° C. and preferably at a temperature of about 20° C. to about 85° C.

In carrrying out the reaction, the reactants are mixed and contacted together in any convenient fashion and the resulting mixture is maintained for a period of time in the reaction temperature range.

Following the reaction of Equation I or Equation II, the reaction mixture is processed by conventional procedures to obtain the desired product. In one such conventional procedure the reaction medium is distilled to separate the volatile material from the desired product. This product can then be employed in pesticidal applications or further purified by such conventional procedures as washing or recrystallization.

DESCRIPTION OF SOME PREFERRED EMBODIMENTS

The following examples describe representative specific embodiments of the novel compounds and the best mode contemplated by the inventor for carrying out the invention, but are not to be considered as limiting thereof. Temperatures are given in centigrade degrees, while refractive index, RI, is given at 25° C. with the D line of sodium as light source.

Example 1: 2-Chloro-4-(((methylthio)methyl)thio)phenyl N-methyl Carbamate

A mixture of 20 g. of 2-chloro-4-(((methylthio)methyl)thio)phenol, 250 ml. of methylene chloride, 25 ml. of methyl isocyanate and 5 drops of triethylamine is permitted to stand at room temperature for about one day. The solution is then evaporated to dryness, and the solid residue is recrystallized from benzene. White crystals, melting at 81.5°–83° are obtained.
Analysis: Calc'd: C, 43.2%; H, 4.36%; N, 5.0%. Found: C, 43.2%; H, 4.59%; N, 4.9%.

Example 2: 4-((2-(Methylthio)ethyl)thio)-3,5-xylyl N-methyl Carbamate

A mixture of 20 g. of 4-((2-(Methylthio)ethyl)-thio)-3,5-xylenol, 250 ml. of methylene chloride, 25 ml. of methyl isocyanate and 5 drops of triethylamine is permitted to stand at room temperature overnight. The solution is evaporated to dryness and the solid residue is recrystallized from a benzene-petroleum naphtha mixture boiling at 60°–70°. White crystals melting at 110°–111° are obtained.
Analysis: Calc'd: C, 54.7%; H, 6.71%; N, 4.91%. Found: C, 54.8%; H, 6.41%; N, 4.87%.

Example 3: p-((2-(Methylthio)ethyl)thio)phenyl N-vinyl Carbamate

To a stirred mixture of 14.5 g. of p-((2-(methylthio)ethyl)thio)phenol, 100 ml. of methylene chloride and 4 drops of triethylamine is added dropwise 6 ml. of vinyl isocyanate. An exothermic reaction takes place. After standing at room temperature overnight the solution is evaporated to dryness and the crystalline residue recrystallized from a benzene-hexane mixture. White crystals melting at 86°–87.5° are obtained.
Analysis: Calc'd: C, 53.50%; H, 5.61%. Found: C, 53.88%; H, 5.67%.

Example 4: p-((2-Methylthio)ethyl)thio)phenyl N,N-diethyl Carbamate

A suspension of the sodium salt of p-((2-(methylthio)ethyl)thio)phenol in benzene is prepared by adding a solution of 6 g. of sodium hydroxide in 10 ml. of water to a solution of 30 g. of p-((2-(methylthio)ethyl)-thio)phenol in 200 ml. of benzene and removing the water by azeotropic distillation. To this suspension is then added dropwise 20.5 g. of diethyl carbamoyl chloride and the mixture is heated under reflux for 2 hours. After cooling to room temperature, the precipitated sodium chloride is removed by filtration and the filtrate concentrated under vacuum. A pale yellow oil is recovered which shows a purity of the titled product of greater than 99 percent by gas liquid chromatography. RI = 1.5587.
Analysis: Calc'd: C, 56.15%; H, 7.07%; N, 4.68%. Found: C, 56.66%; H, 6.78%; N, 4.44%.

Example 5: p-((2-(Methylthio)ethyl)thio)phenyl N-phenyl Carbamate

To a solution of 20 g. of p-((2-(methylthio)-ethyl)thio)phenol in 100 ml. of methylene chloride are added 4 drops of triethylamine and 13 g. of phenyl isocyanate. The resulting solution warms up slightly. After the solution cools to room temperature, hexane is added to it until the reaction product crystallizes. The compound is collected by filtration and recrystallized from a methylene chloride-hexane mixture. White crystals melting at 94°–95° are obtained.
Analysis: Calc'd: C, 60.16%; H, 5.37%. Found: C, 60.2%; H, 5.32%.

The compounds listed in the following Table are prepared in a manner as described above. In most cases, the reaction time varies between about 2 and 10 hours.

TABLE

| Compound | M.P., °C. or (RI) | Analysis, Wt. % Calc'd Found | |
|---|---|---|---|
| OCONHCH₃ phenyl SCH₂SCH₃ | 58.5–60 | C 49.4<br>H 5.38<br>N 5.76 | 49.8<br>5.42<br>5.71 |

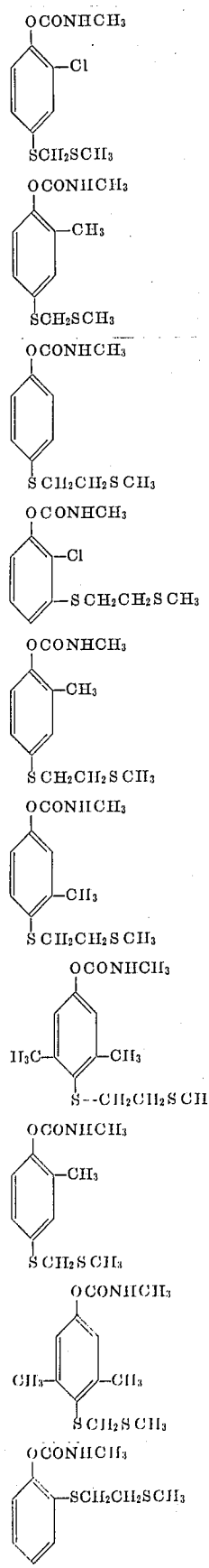
| | | | | |
|---|---|---|---|---|
| | 81.5–83 | C H N | 43.2 4.36 5.0 | 43.2 4.59 4.9 |
| | 83.5–86 | C H N | 51.3 5.88 5.44 | 51.5 6.03 5.75 |
| | 69.5–71 | C H N | 51.3 5.88 5.44 | 51.5 5.79 5.32 |
| | 108.5–110 | C H N | 45.3 4.84 4.80 | 45.0 4.65 4.88 |
| | 88.5–90 | C H N | 53.1 6.32 5.16 | 52.7 6.40 4.95 |
| | 73–75 | C H N | 53.1 6.32 5.16 | 52.9 6.19 5.10 |
| | 110–111 | C H N | 54.7 6.71 4.91 | 54.8 6.41 4.87 |
| | 48.5–52 | C H | 51.33 5.88 | 50.8 5.78 |
| | (1.592) | N | 5.16 | 5.67 |
| | 84–85.5 | C H | 51.33 5.88 | 51.1 6.20 |
| | 57.5–59.5 | C H | 57.47 7.39 | 56.3 7.58 |
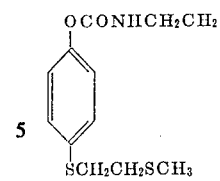
| | | | |
|---|---|---|---|
| 82–85 | C H N | 54.70 6.71 4.91 | 54.7 6.70 5.1 |
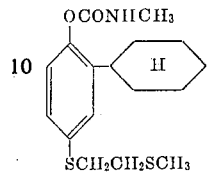
| | | | |
|---|---|---|---|
| 109–111 | C H | 60.14 7.42 | 60.4 7.40 |
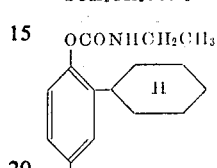
| | | | |
|---|---|---|---|
| 91–92 | C H N | 61.15 7.70 3.96 | 60.8 7.59 4.0 |
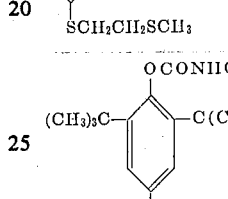
| | | | |
|---|---|---|---|
| 122.5–124 | C H N | 61.75 8.46 3.8 | 61.8 8.50 3.9 |
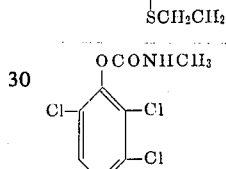
| | | | |
|---|---|---|---|
| 130–132 | C H | 36.62 3.35 | 37.25 3.57 |
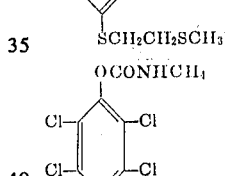
| | | | |
|---|---|---|---|
| 174.5–176.5 | C H N | 35.22 3.20 3.42 | 35.2 3.28 3.47 |
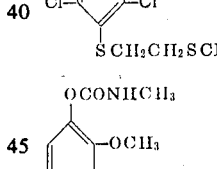
| | | | |
|---|---|---|---|
| 52–54 | C H | 54.68 7.04 | 54.8 6.96 |
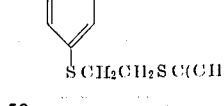
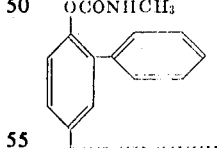
| | | | |
|---|---|---|---|
| 102–104 | C H | 63.96 6.71 | 62.8 6.67 |
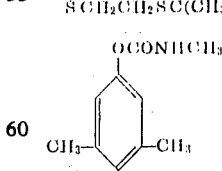
| | | | |
|---|---|---|---|
| 48–51 | C H | 58.68 7.69 | 57.8 7.41 |
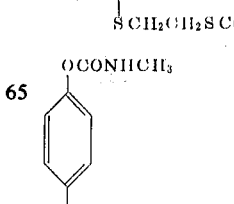
| | | | |
|---|---|---|---|
| (1.5712) | C H | 54.7 6.71 | 53.5 6.43 |

| Compound | mp (°C) | | Calc. | Found |
|---|---|---|---|---|
| 2,6-dimethyl-4-(3-(ethylthio)propylthio)phenyl N-methylcarbamate (OCONHCH₃ / CH₃, CH₃ / S(CH₂)₃SCH₂CH₃) | 40.5–41.5 | C<br>H<br>S | 57.5<br>7.4<br>20.45 | 58.0<br>7.6<br>20.45 |
| 4-(1-methyl-2-(isopropylthio)ethylthio)phenyl N-methylcarbamate (OCONHCH₃ / SCHCH₂SCH(CH₃)₂ / CH₃) | 73–75 | C<br>H | 56.15<br>7.07 | 55.9<br>6.99 |
| 2,6-dichloro-4-(1-methyl-2-(isopropylthio)ethylthio)phenyl N-methylcarbamate (OCONHCH₃ / Cl, Cl / SCHCH₂SCH(CH₃)₂ / CH₃) | 58–60 | C<br>H | 45.65<br>5.20 | 45.3<br>5.05 |
| 2,6-dichloro-4-(1-methyl-2-(isopropylthio)ethylthio)phenyl N-ethylcarbamate (OCONHCH₂CH₃ / Cl, Cl / SCHCH₂SCH(CH₃)₂ / CH₃) | (1.5675) | C<br>H | 47.11<br>5.54 | 47.0<br>5.59 |
| 3,5-dimethyl-4-(4-((3-methylbutyl)thio)butylthio)phenyl N-methylcarbamate (OCONHCH₃ / CH₃ / S(CH₂)₄SCH₂CH(CH₃)₃) | (1.5530) | C<br>H | 59.78<br>7.97 | 59.2<br>7.83 |
| 2-chloro-4-((methylthio)methylthio)phenyl N-vinylcarbamate (OCONHCH=CH₂ / Cl / SCH₂SCH₃) | 75–76.5 | C<br>H<br>N | 45.59<br>4.18<br>4.83 | 45.98<br>4.21<br>5.02 |
| 2,6-dimethyl-4-(2-(methylthio)ethylthio)phenyl N-vinylcarbamate (OCONHCH=CH₂ / CH₃, CH₃ / SCH₂CH₂SCH₃) | 98–100 | C<br>H | 56.53<br>6.44 | 56.71<br>6.45 |
| 2-methyl-4-((methylthio)methylthio)phenyl N-vinylcarbamate (OCONHCH=CH₂ / CH₃ / SCH₂CH₂SCH₃) | 74–77 | C<br>H | 55.09<br>6.05 | 55.65<br>6.04 |

The carbamate esters of this invention are useful as pesticides and antimicrobials for the control of insects and plant pests such as yellow fever mosquitoes, yellow foxtail, bindweed, alfalfa, bean mildew, two-spotted spider mite, *Staphylococcus aureus*, *Candida albicans*, *Trichophyton mentagrophytes*, *Bacillus subtilis*, *Aspergillus terreus*, *Candida pelliculosa*, *Pullularia pullulans*, acid-fast bacterium, and *Rhizopus nigricans*. This is not to suggest that the compounds claimed and compositions containing them are equally effective at similar concentrations or against the same insect, fungal, bacterial and other plant pests. For such use, the unmodified compounds can be employed. Alternatively, the compounds can be dispersed in an edible solid to prepare animal feed compositions or on an inert finely divided solid to prepare dust compositions. The dust compositions can be dispersed in water with or without the aid of a wetting or dispersing agent, the resulting aqueous dispersions being useful as sprays. In other procedures, the compounds can be employed as a constituent in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating compositions is not critical and may vary considerably provided an effective amount of the toxicant is supplied, whether on the plant or plant parts or in the soil, ink, adhesive, cutting oil, textile, paper, wood or other habitat or environment of the organism. Good results are obtained when employing compositions containing controlling or pesticidal concentrations and usually from about 500 to 10,000 parts per million by weight of one or more of the compounds. The concentration of toxicant in liquid compositions generally is from about 1 to 50 percent by weight. Concentrations up to 95 weight percent often are conveniently employed. In dusts, the concentration of the toxicant can be from about 1 to 10 weight percent. In compositions to be employed as concentrates, the toxicant can be present in a concentration of from 5 to 98 weight percent.

In representative operations, 2-chloro-4-(((methylthio)methyl)thio)phenyl N-methyl carbamate, 2-chloro-4-((2-(methylthio)ethyl)thio)phenyl N-methyl carbamate and 2,3,6-trichloro-4-((2-(methylthio)ethyl)thio)phenyl N-methyl carbamate each gives complete kills of *Staphylococcus aureus*, *Candida albicans*, *Trichophyton mentagrophytes*, *Bacillus subtilis*, *Aspergillus terreus*, *Canadida pelliculosa*, *Pullularia pullulans* and *Rhizopus nigricans* when employed in aqueous compositions at a concentration of 500 ppm (parts per million by weight).

In further operations p-(((methylthio)methyl)thio)-phenyl N-methyl carbamate and o-((2-(methylthio)ethyl)thio)-phenyl N-methyl carbamate each gives complete control of house flies, stable flies and brown dog ticks when employed in aqueous compositions at a concentration of 500 ppm.

In still further operations, 4-((2-(methylthio)-ethyl)thio)-3,5-xylyl N-methyl carbamate, 4-(((methylthio)-methyl)thio)-3,5-xylyl N-methyl carbamate, o-((2-(methylthio)-ethyl)thio)phenyl N-methyl carbamate and 5-t-butyl-2-((2-(methylthio)ethyl)thio)phenyl N-methyl carbamate each gives complete control of yellow fever mosquitoes and larvae when employed in aqueous compositions at a concentration of 10 ppm.

The (((alkylthio)alkyl)thio)phenol starting materials are prepared by reacting an alkali metal or ammonium salt of a mercaptophenol and an (alkylthio)alkyl halide according to the following equation wherein $R^1$, $R^2$, $m$, $n$, $Z$, $R^3$ and $p$ have the significance previously given, M is alkali metal or ammonium, and X is chloro-, bromo-, or iodo:

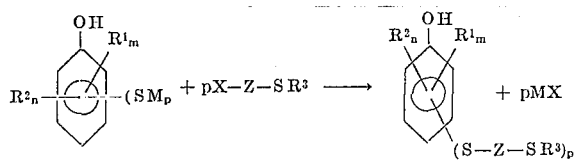

The reaction involves molar equivalents of the mercaptide salt moiety and the halide in a typical alkylation reaction. The reaction is conveniently carried out in an inert solvent as reaction medium, such as, for example, methanol, ethanol, isopropanol or, in some instances, water (water is not recommended in the case of alkylating agents which react with water, for example, monochlorodimethyl sulfide). The amounts of the reagents to be employed are not critical, some of the desired products being obtained when employing any proportions of the reactants. However, the reaction consumes the reactants in stoichiometric proportions, i.e., one equivalent of mercaptide per equivalent of halide, and maximum yields are obtained when about stoichiometric proportions of the reactants are used. The mercaptide salt advantageously is formed in situ by the addition of a base in at least a stoichiometric proportion based on the corresponding mercaptide. Appropriate bases include alkali metal hydroxides, alkali metal alkoxides, alkali metal carbonates, strong amines, strongly basic quaternary ammonium hydroxides, and the like. Alkylation proceeds at a halide salt liberating temperature, conveniently at a temperature of from 0° to 100° C. and preferably at a temperature between 10° and 60° C.

In carrying out the reaction, the reactants are mixed and contacted together in any convenient fashion and the resulting mixture maintained in the reaction temperature range for an appropriate period of time. The reaction time and the reaction temperature depend upon the reactivity of the halide reactant. With a very reactive halide reactant, room temperature and a reaction time of several minutes suffices. With less reactive halide reactants, higher temperatures and longer reaction times are required. The progress of the reaction can be followed by liberation of by-product halide salt.

Alternatively, the (((alkylthio)alkyl)thio)phenol starting materials can also be prepared by reacting a thiocyanophenol and an (alkylthio)alkyl halide in the presence of a base according to the following equation wherein reactants and product are indicated, and wherein $R^1$, $R^2$, $m$, $n$, $Z$, $R^3$, $p$ and $X$ have the significance previously given:

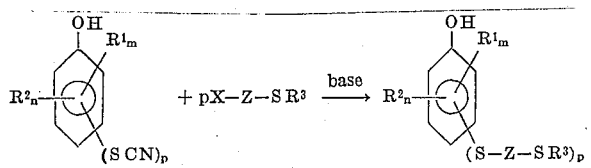

The conditions for the conversion of thiocyanophenols into the (((alkythio)alkyl)thio)phenols are substantially identical with the conditions described in U. S. Pat. No. 3,303,209, patented Feb. 7, 1967, for the preparation of phenol thioethers from the corresponding thiocyanates and alkylating agents, for example, alkyl chlorides.

The alkyl, vinyl, and phenyl isocyanate and the N,N-dialkyl carbamoyl chloride starting materials and methods for their prepartion are old and well known.

What is claimed is:

1. A compound of the formula

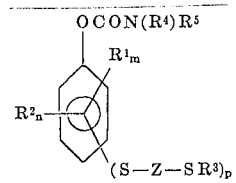

wherein $R^1$ represents a lower alkyl, lower alkoxy, fluoro, chloro, bromo or iodo group, $R^2$ represents an $R^1$ or a cyclopentyl, cyclohexyl, naphthyl or trifluoromethyl group; $m$ represents an integer from 0 to 3; $n$ represents an integer from 0 to 2; $Z$ represents a 1 to 4 carbon straight-chain or branched-chain alkylene group; $R^3$ represents a lower alkyl group; $p$ represents an integer from 1 to 2; $R^4$ represents a lower alkyl, vinyl or phenyl group; $R^5$ represents a lower alkyl or an H group; and the sum of $m+n+p$ is an integer from 1 to 5.

2. The compound as claimed in claim 1 which is 2-chloro-4-(((methylthio)methyl)thio)phenyl N-methyl carbamate.

3. The compound as claimed in claim 1 -((is 2-chloro-4-((2-(methyl)ethyl)thio)phenyl N-methyl carbamate.

4. The compound as claimed in claim 1 which is 2,3,6-trichloro-4-((2-methylthio)ethyl)thio)phenyl N-methyl carbamate.

5. The compound as claimed in claim 1 which is p-(((methylthio)methyl)thio)phenyl N-methyl carbamate.

6. The compound as claimed in claim 1 which is o-((2-(methylthio)ethyl)thio)phenyl N-methyl carbamate.

7. The compound as claimed in claim 1 which is 4-((2-(methylthio)ethyl)thio)-3,5-xylyl N-methyl carbamate.

8. The compound as claimed in claim 1 which is p-((2-(methylthio)ethyl)thio)phenyl N-vinyl carbamate.

9. The compound as claimed in claim 1 which is p-((2-(methylthio)ethyl)thio)phenyl N,N-diethyl carbamate.

10. The compound as claimed in claim 1 which is p-((2-(methylthio)ethyl)thio)phenyl N-phenyl carbamate.

* * * * *